United States Patent [19]

Cottle

[11] 3,725,377

[45] Apr. 3, 1973

[54] PROCESS FOR POLYMERIZING 1-3-BUTADIENE MONOMER

[75] Inventor: John E. Cottle, Bartlesville, Okla.

[73] Assignee: Phillips Petroleum Company, Bartlesville, Okla.

[22] Filed: May 11, 1970

[21] Appl. No.: 37,410

Related U.S. Application Data

[63] Continuation of Ser. No. 552,441, Jan. 24, 1966, abandoned.

[52] U.S. Cl..........260/94.2 R, 260/93.7, 260/93.5 S, 260/94.2 M, 260/94.9 F, 260/95 R
[51] Int. Cl. ............................C08d 3/06, C08d 5/00
[58] Field of Search...260/94.2 M, 68.5, 94.2 R, 94.3

[56] References Cited

UNITED STATES PATENTS

| | | | |
|---|---|---|---|
| 3,209,050 | 9/1965 | Hanson | 260/681.5 |
| 3,280,094 | 10/1966 | Forman | 260/94.2 |
| 3,283,025 | 11/1966 | Lenz et al. | 260/677 |

*Primary Examiner*—James A. Seidleck
*Assistant Examiner*—William F. Hamrock
*Attorney*—Young and Quigg

[57] ABSTRACT

A process for polymerization of monomers containing ethylenic unsaturation including contacting the polymerization feed stock stream with an adsorbent material, and periodically regenerating the adsorbent material with purified separated nonpolymerizable hydrocarbons separated from the feed stock stream after effectuation of the polymerization step.

1 Claim, 1 Drawing Figure

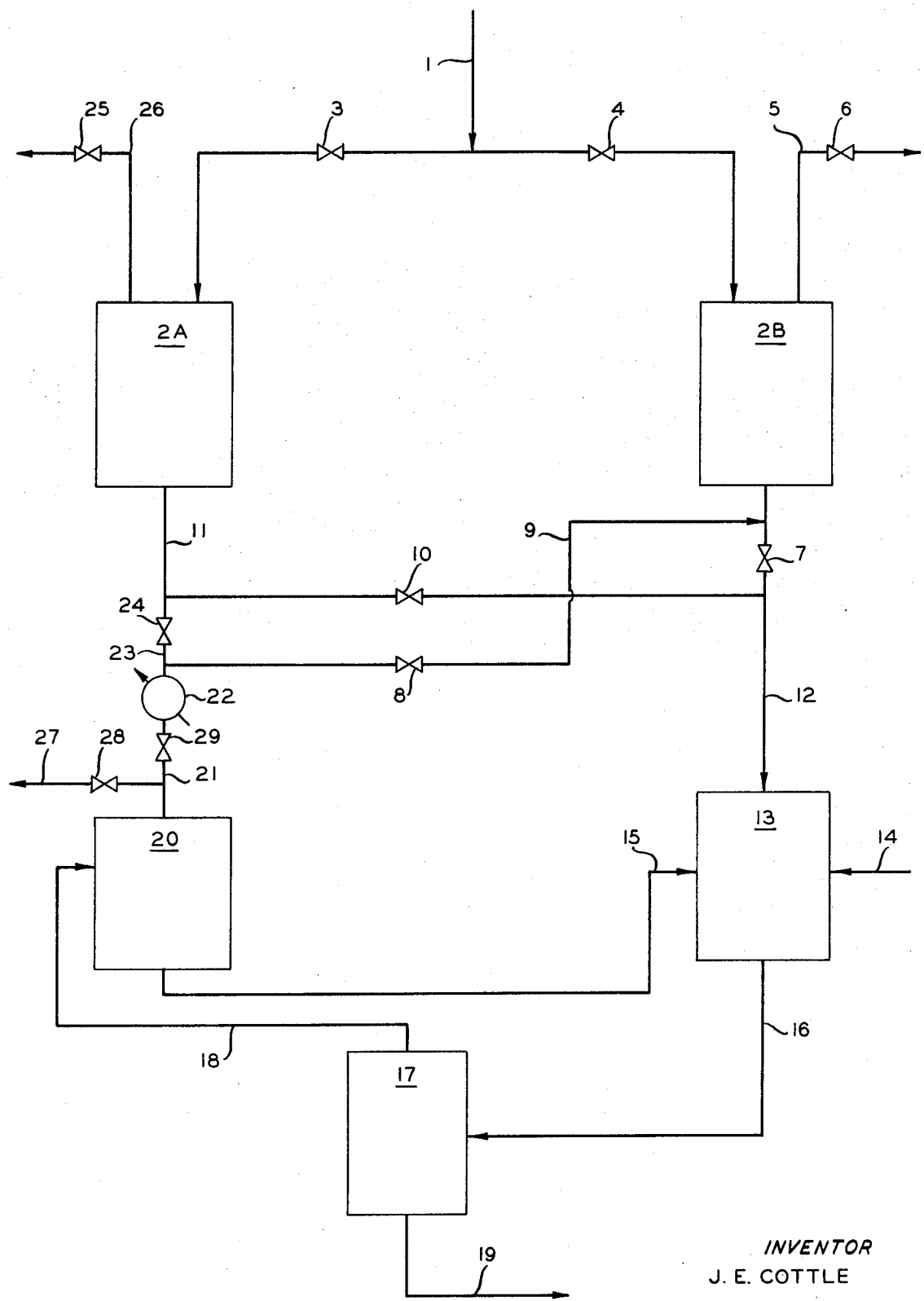

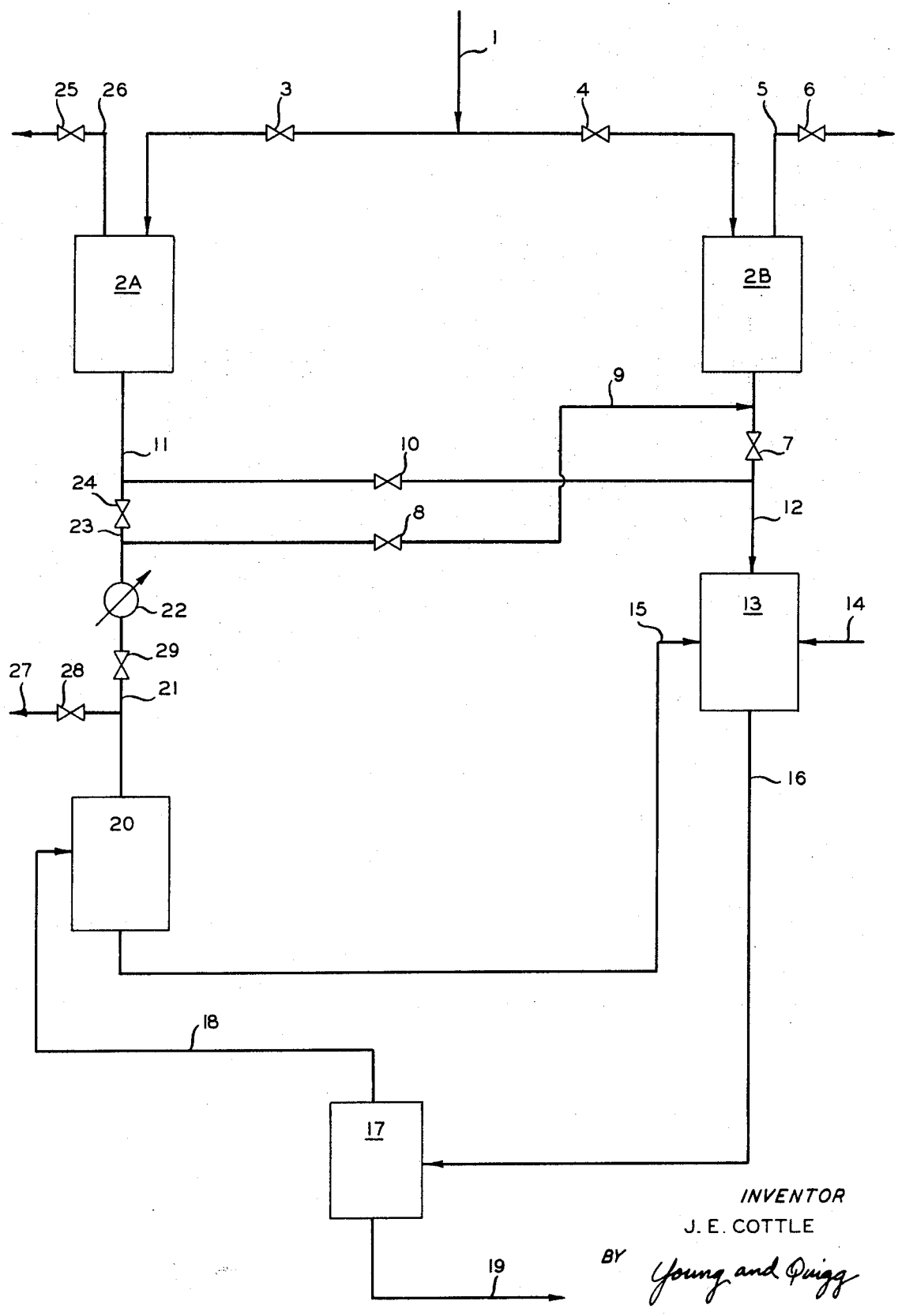

PROCESS FOR POLYMERIZING 1-3-BUTADIENE MONOMER

This is a continuation of copending application Ser. No. 522,441, filed Jan. 24, 1966, now abandoned.

This invention relates to an improved process for purifying polymerization feed streams by use of adsorbents. In another aspect, this invention relates to an improved process for desorbing or regenerating adsorption zones that are used to purify polymerization feed streams.

Various polymerization processes for utilizing organometallic initiators are known in the art. Generally, such polymerization processes require substantially pure feed streams of the various reactants. Many components cannot be tolerated in the polymerization system because they are known to destroy the catalyst activity or adversely affect the final properties of the polymerization product. Therefore, it is necessary to obtain feed streams of the various polymerization reactants that do not contain the various impurities.

Many processes have been suggested for the removal of deleterious components from polymerization feed streams. For example, the feed streams may be subjected to selective hydrogenation to convert the deleterious products to inert components that can be tolerated in the polymerization system. The polymerization feed streams can also be subjected to a fractional distillation wherein the harmful components are removed. However, such processes usually remove only a major portion of the impurities and minor amounts of the impurities remain in the polymerization feed streams. Various impurities such as acetylenes, aldehydes, water, oxygen, etc., can have a drastic effect upon the polymerization reaction if they are allowed to enter the polymerization zone with the monomer feed stream. Recently, it has been suggested to pass the polymerization feed streams through various adsorption zones to remove the harmful impurities from the feed stream prior to introduction into the polymerization zone. Various adsorbents are known in the art. By the proper selection of adsorbents, it is now possible to selectively remove several of the most undesirable impurities from the polymerization feed stream.

Since most known adsorbents are quite expensive, it is necessary to regenerate the adsorbents to allow them to be reused. Various methods for adsorbent regeneration are known in the art. For example, live steam, heated gas, and the like can be passed through the adsorbent bed to displace impurities that have been adsorbed therein. The use of such materials to desorb or regenerate the adsorption beds is undesirable because a portion of the desorbing material remains in the adsorption bed at the end of the regeneration cycle. This material is then passed to the polymerization system when the adsorption bed is reused.

I have discovered a method for purifying polymerization reactants prior to their introduction into the polymerization reactor by the use of an adsorption zone. My invention provides an improved method for removing the impurities from the polymerization reactant feed streams. My invention also provides a method for the subsequent regeneration of the adsorption zone without the introduction of impurities into the polymerization system.

It is therefore an object of my invention to provide an improved process for purifying polymerization feed streams. Another object of my invention is to provide an improved process for the purification of polymerization reactants by passing them through an adsorption zone that can be subsequently regenerated without introducing extraneous impurities into the polymerization system.

Various other aspects, objects, and advantages of my invention will be apparent to those skilled in the art upon examining this specification and the claims.

My invention involves purifying polymerization feed streams by passing them through an adsorption zone to selectively adsorb impurities in the feed stream. The effluent from the adsorption zone, containing little or no impurities that are deleterious to the polymerization reaction, is then charged to a polymerization zone. The polymerization is carried out in the presence of an organometal catalyst system and a polymerization diluent. At the completion of the polymerization reaction, the contents of the polymerization zone are separated into two main streams. In one stream, the polymer product is removed from the system. In the other stream, the unreacted components are removed from the polymerization zone and at least a portion of the unreacted components, which are the unreacted or nonpolymerizable hydrocarbons together within polymerization diluent employed in the polymerization reaction zone, is heated and passed through the adsorption zone to desorb the impurities that have been adsorbed therein. The stream containing the desorbed impurities is then removed from the polymerization system. By using this process, no extraneous impurities are introduced into the polymerization system. At the completion of the desorption cycle, the adsorption zone can be cooled and the polymerization feed stream, containing impurities, can be passed therethrough without subsequent treatment. This process thus allows a novel purification and regeneration process that uses available materials within the polymerization system and prevents the introduction of impurities into the system.

My invention can be used in any polymerization process wherein the various feed streams that are introduced to the system contain impurities that can be removed by selective adsorption. Various adsorbents are well known in the art and include such materials as silica gels, activated carbon, alumina, naturally occurring molecular sieves and synthetic molecular sieves. The selection of the proper adsorbent for removal of various impurities in the polymerization reactant streams is within the skill of the art. Normally my process will be carried out in an apparatus wherein the adsorbent is maintained as a fixed bed in an adsorption column. However, the adsorbent can be maintained in a moving bed, or in a system wherein the adsorbent material is simply mixed with the feed stream and allowed to stand until the desired adsorption takes place.

Almost any feed stream to the polymerization reactor can be passed through the adsorption zone to remove impurities therefrom. For example, the monomer feed stream containing the polymerizable monomer can be passed through the adsorption zone either alone or in combination with the polymerization diluent. My invention is not limited to any particular polymerization system. Therefore, my invention can be used to purify feed streams containing 1-olefins such as ethylene, propylene, butylene, and the like. My process can also be used for purifying feed streams containing conjugated dienes such as 1,3-butadiene, isoprene, piperylene, and the like. Various other monomers such as vinyl-substituted aromatics, e.g., styrene, vinylnaphthalenes, and the like can also be purified by my invention. It is also possible to purify mixtures of the foregoing monomers. My process can also be used for purifying various polymerization diluents that are charged to the polymerization zone. Such diluents include isopentane, n-hexane, n-heptane, isooctane, cyclohexane, benzene, toluene, and the like.

A recent development in the field of conjugated diene polymerization reactions, involves the polymerization of a low concentration butadiene stream. It has been discovered that polymerization feed streams containing from about 20 to 80 parts by weight of butadiene can be easily polymerized in the presence of known initiators such as organolithium initiators. Suitable feed streams can be economically produced by using a feed stream from a naphtha cracking unit. The feed stream from the naphtha cracking unit contains various impurities that are deleterious to the polymerization reaction. Therefore, the feed stream is initially treated in several ways to either remove the harmful impurities or to convert them to non-deleterious materials. For example, it has been suggested to selectively hydrogenate the feed stream to convert such materials as acetylenes to non-deleterious materials. After the selective hydrogenation, the stream can then be subjected to fractional distillation to remove other harmful components. The resulting stream contains a major portion of the 1,3-butadiene and other $C_4$ hydrocarbons, such as butanes, and butenes. However, the stream also contains small amount of unconverted acetylenes and carbonyl-containing components. These impurities have a harmful effect on the polymerization reaction and on the polymer products so produced. Therefore, the thus treated feed stream containing the impurities can be passed through an adsorption zone. It has been found that molecular sieves can be used to remove most if not all of the acetylenic compounds and the carbonyl-containing compounds as well as other impurities.

My invention can best be described by reference to the accompanying drawing. The drawing represents a block diagram of a polymerization process wherein a feed stream from a naphtha cracking unit is polymerized. The apparatus shown in the drawing is designed for a continuous operation wherein the polymerization feed stream is purified in one adsorption zone while a second adsorption zone is regenerated.

In the drawing, a low concentration of a butadiene stream, derived from a naphtha cracking unit, is charged to the system through conduit 1. 1. feed stream has been previously subjected to selective hydrogenation to convert the various components such as acetylenes to non-deleterious materials that can be tolerated by the polymerization system. The stream has been subjected to fractional distillation to remove most of the deleterious materials that would adversely affect the polymerization reaction and the products produced by such a reaction. Therefore, the stream in conduit 1 will comprise a mixture of the butadiene, various butanes, butenes, and minor amounts of acetylenic impurities, carbonyl-containing impurities, and the like. Adsorber 2a is regenerated while adsorber 2b is utilized to purify the feed stream to the polymerization reactor. Valve 3 is closed preventing the polymerization feed stream from entering adsorber 2a. Valve 4 is opened to allow passage of the feed stream into adsorber 2b. Vent line 5 from adsorber 2b is closed by means of valve 6 disposed therein. Exit valve 7 in the adsorber effluent line is opened and valve 8 in regeneration line 9 is closed. Valve 10 in effluent line 11 from adsorber 2a is closed. The polymerization feed stream is passed slowly through adsorber 2b. As the stream passes through the molecular sieve material packed in adsorber 2b, various impurities such as acetylenes, carbonyl-containing compounds, and other materials such as 1,2-butadiene are selectively adsorbed. The thus purified polymerization feed stream is withdrawn from adsorber 2 b and passed through line 12 into polymerization zone 13. A polymerization initiator such as n-butyllithium is charged to polymerization zone 13 through line 14. A polymerization diluent such as cyclohexane is charged through line 15. The mixture is allowed to polymerize in polymerization zone 13. Upon completion of the desired polymerization reaction, the contents of the polymerization zone 13 are removed through line 16 and passed to separation zone 17. Separation zone 17 can be any suitable vessel for separating the polymer product from the unreacted components that were present in polymerization zone 13. One suitable apparatus is a flash tank wherein the unreacted components are flashed overhead and removed through conduit 18. The polymer product is removed through line 19 and is passed to a polymer processing zone wherein it can be treated for catalyst inactivation, and compounded with various antioxidants and the like. The unreacted components removed through line 18 are passed to fractionation zone 20 wherein they are separated into two main streams. The cyclohexane diluent is removed from fractionation zone 20 through line 15 and returned to the polymerization zone 13.

The lighter components comprising the unreacted butanes and butenes are removed from fractionation zone 20 through conduit 21 and at least a portion of them is passed through heat exchanger 22 wherein it is heated and thereafter passed through line 23 and regeneration line 11 into adsorption zone 2a. While adsorption zone 2a is being regenerated, valve 24 disposed in line 23 is opened and valve 25 in vent line 26 is opened. The heated stream comprising the butenes and butanes contacts the molecular sieve packed in adsorber 2a and displaces the previously adsorbed impurities. The impure stream comprising the desorbed impurities, butanes and butenes, is then removed through line 26.

After the system has operated for a sufficient length of time to regenerate adsorption zone 2a, the unreacted butanes and butenes can be removed from the system through line 27 by opening valve 28 disposed therein and closing valve 29 disposed in line 21. This stops the flow of the unreacted butanes and butenes through heat exchanger 22 and through adsorption zone 2a. Valve 25 in vent line 26 from adsorber 2a is then closed and valve 24 in regeneration line 23 is also closed. Thereafter, adsorber 2a is cooled by any suitable means such as passing cool butanes and butenes therethrough.

When the molecular sieve in adsorber 2b becomes saturated with impurities, it can be regenerated while adsorber 2a is used to purify the feed stream. This is very easily accomplished by opening valves 3 and 10 to allow the passage of the feed stream through adsorber 2a and closing valves 4 and 7 to isolate adsorber 2b from the feed stream. Thereafter, valve 8 can be opened in regeneration line 9 along with valve 6 in vent line 5. Valve 29 in line 21 is opened to allow the butanes and butenes to pass through heat exchanger 22 and valve 28 in line 27 is closed. The process of regeneration of adsorber 2b is then carried out as described above for adsorber 2a.

It will be obvious to one skilled in the art that the foregoing description of the FIGURE illustrates the one simple operating procedure for carrying out my invention. Various refinements and modifications may be made without departing from the scope of my invention. For example, it will be possible to operate the regeneration of the adsorption zones by passing only a portion of the unreacted butanes and butenes to heat exchanger 22 and thereafter to the adsorption zone, with the remainder of the stream being withdrawn through line 27 simultaneously. It is also possible to cool the adsorption zone after the degeneration step by bypassing heat exchanger 22 with the butane and butene stream. Thus, the relatively cool stream from separation zone 20 can be passed through the molecular sieve adsorbent to cool the bed to operating temperature prior to introduction of the feed stream during the adsorption cycle. Make-up solvent may be added to the system by addition to line 1 and thereby purified simultaneously with butadiene.

Various modifications and changes to the above procedure can be made by one skilled in the art without departing from the concept of my invention.

The following example illustrates one preferred embodiment of my invention. The example is included to illustrate the adsorption and desorption processes utilized in my invention. The material contained in the example should not be considered as unduly limiting the scope of my invention as disclosed hereinbefore.

EXAMPLE

A polymerization process is carried out using the apparatus shown in the FIGURE. A feed stream derived from a naphtha-cracking unit is used as the source of butadiene for the polymerization reaction. The feed stream has previously been subjected to selective hydrogenation and fractional distillation. The analysis of the feed stream is shown in the table under the column designated as stream 1. The feed stream containing minor amounts of acetylenes, carbonyl-containing compounds, allene, and 1,2-butadiene impurities is passed through an adsorber that is packed with a molecular sieve. The molecular sieve is a 13X molecular sieve sold by the Linde Air Products Co. The effective pore size of the 13X molecular sieve is 9 angstrom units. (Molecular sieves having an effective pore size of from about 5 to about 25 angstrom units have been found to be most effective for removing such impurities as acetylenes, carbonyl-containing compounds, allene, and various other non-conjugated dienes impurities.) During the adsorption cycle, the adsorption zone is operated at a temperature of about 100° F and at a pressure of 35 psia. The adsorption is carried out with the feed stream in the liquid phase. The feed stream is passed through the molecular sieve at a rate of about 10 volumes of feed per volume of adsorbent per hour. The composition of the adsorber effluent is shown in the table and designated as stream 12. The purified butadiene stream is then charged to the polymerization reactor along with an n-butyllithium initiator and substantially pure cyclohexane diluent. After the polymerization has proceeded to the desired level, the polymerization mixture is passed to a polymer separation zone wherein the diluent and other unreacted hydrocarbon materials in the polymerization mixture are flashed overhead. The polymer product is removed and passed to a polymer processing apparatus wherein it is treated to inactivate the initiator, compounded with various antioxidants and the like, and ultimately recovered. The overhead from the polymer separation zone is passed to a fractionator wherein the cyclohexane diluent is removed as bottoms and returned to the polymerization zone. The overhead from this fractionator, containing the various unreacted hydrocarbons that were present in the initial feed, is then passed to a heat exchanger wherein the stream is heated to approximately 450° F at a pressure of 50 psig. (Molecular sieves can be desorbed over a wide temperature range of from about 250° to 1,000°F.)

When using the above procedure and conditions, the effective life of the adsorber beds is approximately 16 days. Therefore, the cycle for regeneration of the contaminated molecular sieve bed is once every 32 days. The regeneration is carried out by passing the heated vapor from the above-mentioned heat exchanger through the molecular sieve bed. The adsorbed impurities are displaced from the molecular sieve and removed from the system through a suitable vent line. During the desorption cycle, substantially all of the adsorbed impurities are displaced from the molecular sieve and removed through the vent system. The composition of the regeneration gas is shown in the table as stream 11. The figures shown for stream 11 represent the materials used during the regeneration cycle which may require 1 to 2 days. At the conclusion of the regeneration cycle, the regenerated bed is cooled and thereafter used to purify the polymerization feed stream.

TABLE

| Component | Stream 1 (lb/day) | Stream 12 (lb/day) | Stream 11 lb/16 days |
|---|---|---|---|
| Allene | 5 | 0 | 0 |
| Isobutane | 9,343 | 9,343 | 87 |
| Isobutylene | 123,151 | 123,151 | 1,114 |
| Butene-1 | 59,595 | 59,595 | 536 |
| 1,3-Butadiene | 143,644 | 143,644 | 124 |
| N-butane | 8,997 | 8,997 | 787 |
| Trans-Butene-2 | 24,338 | 24,338 | 212 |
| Cis-Butene-2 | 15,149 | 15,149 | 129 |
| Acetylenes | 13 | 0 | 0 |
| 1,2-Butadiene | 269 | 5 | 2 |
| Carbonyls | 105 | 0 | 0 |

I claim:

1. A process for polymerizing 1,3-butadiene monomer, wherein a feed stream containing said 1,3- butadiene monomer together with unreactable hydrocarbon consisting essentially of butanes and butenes and with impurities tending to poison an organometal polymerization catalyst, is polymerized in the presence of said organometal catalyst and in the presence of a polymerization diluent selected from isopentane, n-hexane, n-heptane, isooctane, cyclohexane, benzene, toluene, or xylene, which process comprises:

a. at least partially prepurifying said feed stream at least by hydrogenation and fractional distillation,
b. contacting said partially prepurified feed stream with an adsorbent material, said adsorbent material being selected from silica gel, activated carbon, alumina, naturally occurring molecular sieves, and synthetic molecular sieves, and thereby selectively removing said impurities from said feed stream,
c. polymerizing said purified feed stream from said step (b),
d. separating the polymer resulting from said step (c) from unpolymerized hydrocarbons comprising said unreactable hydrocarbons and said polymerization diluent,
e. separating said unpolymerized hydrocarbons into a stream of said polymerization diluent and a stream of said unreactable hydrocarbons,
f. returning said polymerization diluent from said step (e) to said step (c),
g. heating said unreactable hydrocarbons,
h. contacting said adsorbent material containing said adsorbed impurities with said heated unreactable hydrocarbons, thereby desorbing said adsorbed impurities,
i. venting said unreactable hydrocarbons and said desorbed impurities,
j. cooling the desorbed adsorbent material from said step (g),
k. returning said desorbed cooled adsorbent material to said step (b) as said adsorbent material,
l. repeating said steps (a) through (k).

* * * * *